Oct. 6, 1959     H. GROTE     2,907,430

CLUTCH WITH FRICTIONALLY HELD LINING

Filed Nov. 9, 1954

INVENTOR
Hugo Grote.
Morgan Finnegan Durham and Pine
Attorneys.

United States Patent Office 2,907,430
Patented Oct. 6, 1959

2,907,430
CLUTCH WITH FRICTIONALLY HELD LINING

Hugo Grote, Wetter (Ruhr), Germany

Application November 9, 1954, Serial No. 467,863

Claims priority, application Germany November 14, 1953

5 Claims. (Cl. 192—66)

The invention relates to a brake or coupling, in which at least one of the two parts adapted for frictional engagement is provided with a friction lining. These friction linings are generally riveted to their supports. However, such a procedure has the disadvantage that the linings by repeated blows are eventually loosened in the bores constituting the rivet holes, by the peripheral forces generated by the braking operation. Moreover, the linings can only be utilized as far as to the zone of the countersunk rivets. Moreover, the replacement of worn friction linings is complicated and time-wasting.

It has, therefore, been proposed to secure the friction linings to the support by means of a suitable binding agent. However, unless the binding agent is applied in a layer of uniform thickness, there is the danger of the friction lining assuming the wrong position, so that the required braking moment is not attained. Finally, if the friction lining is secured in this manner, replacement is still difficult because after the worn lining has been torn off, it is necessary to remove any remaining binding agent from the bearing surface.

According to the invention, the friction lining is secured in position by using (instead of the binding agent) an elastic intermediate layer, the quality of which is such that it bears with initial tension on its support, the material of the intermediate layer having a higher co-efficient of friction than the material used as the friction lining. This condition may, for example, be met by using as the intermediate layer rubber, the co-efficient of friction against metal of which amounts to 0.70, whereas the material used as friction lining has generally a co-efficient of friction against metal of 0.35.

By this method according to the invention it is possible to secure the intermediate layer on its support as well as to secure the friction lining on the intermediate layer by a simple pressing-on operation.

For example, with a cone brake or a cone clutch, the intremediate layer may consist of a tapered ring of frustoconical section the outer and inner faces of which extend in parallel relation, and which is slipped on to the support, the friction lining being pressed on to the tapered ring. The fitting of the friction lining is extremely simple and does not require any tool or other aid. For replacement of the friction lining it is merely necessary to use a screw-driver or the like for releasing the friction lining. In most cases it is not even necessary to detach the friction or coupling disc from the shaft.

Instead of using a tapered ring, it is also possible to use one or more rings of a circular or a similar cross-section as the intermediate layer, the rings being received with initial tension in grooves of corresponding shape provided in the friction lining and in the support. When rings of tear-shaped cross-section and with conical connecting faces with the point directed towards the counter-disc are used, the fitting of the friction lining is facilitated without any danger of the friction lining being drawn from the support when the brake or coupling is released, due to the static friction existing between the friction lining and the counter-disc. For this last purpose, it is also possible for an intermediate layer, which supports the friction layer throughout its width, to be formed with an annular bulge which is received in a corresponding groove provided in the support. Thus the fitting of the friction lining is also facilitated, any undesirable loosening being avoided by providing the side walls of the annulus at different angles towards the axis of the brake or coupling in such manner that the wall away from the point of the cone has a greater inclination than the other wall. The support or the friction lining may also be provided with an annular bulge of this kind, which is received in a groove provided in the intermediate layer.

The inner surface of the intermediate layer may also be cylindrical, so that the invention may also be applied to brakes with cylindrical friction linings.

The invention is also applicable to flange couplings and disc brakes. In such cases it is merely necessary to insert between the friction lining and the disc an annular disc of a material having the properties referred to, and to see to it that the intermediate layer is provided with initial tension.

The thickness of the intermediate layer has no effect on its efficiency.

Apart from rubber, any other material having a high co-efficient of friction and a certain elasticity, may be used.

Figure 1:
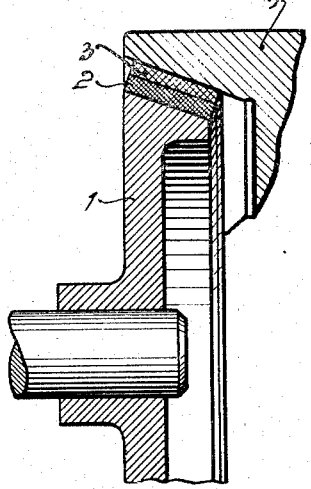
Fig. 1 is a sectional view of a conical brake utilizing the present invention.
Figure 2:
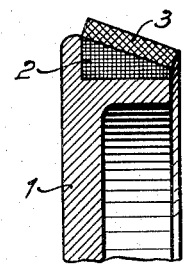
Fig. 2 is a partial view of the brake of Fig. 1 showing a modified form of the invention.
Figure 3:
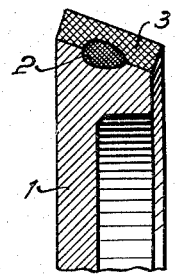
Fig. 3 is a view similar to Fig. 2 showing still another modification of the invention.
Figure 4:
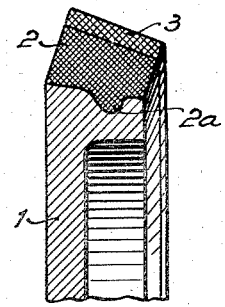
Fig. 4 is a view similar to Figs. 2 and 3 showing another modification of the invention.

In the drawings, Figures 1 to 4 show a number of examples of carrying out the invention as applied to a cone brake. In all constructions, the supporting disc is denoted by 1, the intermediate layer by 2 and the friction lining by 3. The friction lining co-operates with the stationary friction disc, which is only shown in Figure 1 and is denoted by 4. In the construction illustrated in Figure 3, the intermediate layer is formed as a ring of tear-shaped cross-section. The intermediate layer shown in Figure 4 is formed with an annular bulge 2a which is received in a corresponding groove 3a provided in the support. The side walls of the bulge 2a are inclined at different angles from the axis of the coupling and the inclination of the wall further away from the apex of the conical supporting disc 1 is greater than the corresponding inclination of the wall nearer the apex.

In all cases it is advantageous to roughen the contact faces between the intermediate layer and the support and/or the friction lining to improve frictional engagement.

I claim:

1. A coupling comprising two parts of frusto-conical shape adapted for frictional driving engagement, including a friction lining formed as a ring for one of said parts and means comprising a layer of resilient material positioned intermediate the friction lining and said one part, said intermediate layer being mounted on said one part under tension, and being made of a material having a higher co-efficient of friction than the material used as the friction lining.

2. A coupling according to claim 1 in which the said one part is provided with a groove on its upper surface, and the friction lining is provided with a corresponding groove in the under surface thereof, and the intermediate layer is formed as an enlarged bulge complementary to and received in said groove.

3. A coupling according to claim 1, in which one of the contact surfaces in engagement with the intermediate layer is roughened.

4. A coupling according to claim 1 in which an annular bulge having adjacent side walls is formed in the intermediate layer, said one part having an annular groove provided in its peripheral surface of a form corresponding to the side walls of said bulge, the side walls of the bulge and the groove having a general inclination at different angles to the apex of the frusto-conical parts so that the inclination of the wall extending in a general direction away from the apex of the frusto-conical parts is greater than the corresponding inclination of the other wall.

5. A coupling according to claim 1, in which a support is provided for the intermediate layer which is formed with a cavity of corresponding form to receive it.

References Cited in the file of this patent

UNITED STATES PATENTS

| | | |
|---|---|---|
| 302,449 | Titus | July 22, 1884 |
| 1,430,143 | Barefoot et al. | Sept. 26, 1922 |
| 1,872,547 | Zeder | Aug. 16, 1932 |
| 2,344,592 | Brownlee | Mar. 21, 1944 |
| 2,690,246 | Kelleigh | Sept. 28, 1954 |

FOREIGN PATENTS

| | | |
|---|---|---|
| 997,818 | France | Sept. 19, 1951 |